United States Patent
Kawamura et al.

(10) Patent No.: US 12,024,578 B2
(45) Date of Patent: Jul. 2, 2024

(54) CURABLE COMPOSITION

(71) Applicant: Nitto Shinko Corporation, Sakai (JP)

(72) Inventors: Ryuji Kawamura, Sakai (JP); Hirofumi Fujii, Sakai (JP)

(73) Assignee: NITTO SHINKO CORPORATION, Fukui (JP)

( * ) Notice: Subject to any disclaimer, the term of this patent is extended or adjusted under 35 U.S.C. 154(b) by 485 days.

(21) Appl. No.: 17/421,197

(22) PCT Filed: Jan. 9, 2020

(86) PCT No.: PCT/JP2020/000380
§ 371 (c)(1),
(2) Date: Jul. 7, 2021

(87) PCT Pub. No.: WO2020/145328
PCT Pub. Date: Jul. 16, 2020

(65) Prior Publication Data
US 2022/0081504 A1    Mar. 17, 2022

(30) Foreign Application Priority Data

| Jan. 11, 2019 | (JP) | 2019-003630 |
| Feb. 7, 2019 | (JP) | 2019-020657 |
| Oct. 18, 2019 | (JP) | 2019-191320 |

(51) Int. Cl.

| C08F 290/06 | (2006.01) |
| C08F 2/50 | (2006.01) |
| C08F 220/18 | (2006.01) |
| C08F 220/20 | (2006.01) |
| C08G 18/10 | (2006.01) |
| C08G 18/24 | (2006.01) |
| C08G 18/62 | (2006.01) |
| C08G 18/73 | (2006.01) |
| C08G 18/79 | (2006.01) |

(52) U.S. Cl.
CPC ............ *C08F 290/067* (2013.01); *C08F 2/50* (2013.01); *C08F 220/1811* (2020.02); *C08F 220/20* (2013.01); *C08G 18/10* (2013.01); *C08G 18/246* (2013.01); *C08G 18/6204* (2013.01); *C08G 18/6254* (2013.01); *C08G 18/73* (2013.01); *C08G 18/791* (2013.01)

(58) Field of Classification Search
USPC .................. 522/90, 96, 97, 98, 174
See application file for complete search history.

(56) References Cited

U.S. PATENT DOCUMENTS 7,547,735 B1 * 6/2009 Konarski .............. C08L 19/006
522/18
2015/0030836 A1   1/2015 Ooga et al.
2016/0208148 A1   7/2016 Niimi et al.

FOREIGN PATENT DOCUMENTS

| CN | 103890026 A | 6/2014 |
| CN | 109071695 A | 12/2018 |
| JP | 63-220240 A | 9/1988 |
| JP | 4-33973 A | 2/1992 |
| JP | 4-248847 A | 9/1992 |
| JP | 6-80757 A | 3/1994 |
| JP | 2000-256641 A | 9/2000 |
| JP | 2012-121935 A | 6/2012 |
| JP | 2013-242724 A | 12/2013 |
| JP | 2014-201593 A | 10/2014 |
| JP | 2015-052118 A | 3/2015 |
| JP | 2015-71682 A | 4/2015 |
| JP | 2015-227433 A | 12/2015 |
| JP | 2017-57349 A | 3/2017 |
| JP | 2018-90683 A | 6/2018 |
| WO | 2012-043550 A1 | 4/2012 |
| WO | 2013/137006 A1 | 9/2013 |
| WO | 2016/031952 A1 | 3/2016 |

OTHER PUBLICATIONS

International Search Report dated Mar. 31, 2020, issued in counterpart International Application No. PCT/JP2020/000380. (3 pages).
Extended (Supplementary) European Search Report dated Aug. 19, 2022, issued in counterpart application No. 20738632.7. (7 pages).
Extended (Supplementary) European Search Report dated Aug. 19, 2022, issued in application No. 20738552.7 (7 pages).
International Search Report dated Mar. 31, 2020, issued in International Application No. PCT/JP2020/000379. (3 pages).
Notification of Transmittal of Translation of the International Preliminary Report on Patentability (Form PCT/IB/338) issued in counterpart International application No. PCT/JP2020/000380 mailed Jul. 22, 2021 with Forms PCT/IB/373 and PCT/ISA/237, with English translation. (12 pages).
Office Action dated Apr. 19, 2023, issued in counterpart CN application No. 202080008162.3, with English translation. (10 pages).
Office Action dated Apr. 18, 2023, issued in CN application No. 202080008135.6 (counterpart to U.S. Appl. No. 17/421,186:), with English translation. (10 pages).
Non-Final Office Action dated Feb. 22, 2023, issued in U.S. Appl. No. 17/421,186. (15 pages).

* cited by examiner

*Primary Examiner* — Sanza L. McClendon
(74) *Attorney, Agent, or Firm* — WHDA, LLP

(57) ABSTRACT

Provided is, for example, a curable composition including: a curable compound having, in a molecule, a branched polyolefin structure, a (meth)acryloyl group, and an isocyanate group; and an alicyclic (meth)acrylate monomer having, in a molecule, a cycloalkyl structure and a (meth)acryloyl group.

4 Claims, 1 Drawing Sheet

CURABLE COMPOSITION

CROSS-REFERENCE TO RELATED APPLICATION

This application claims priority to Japanese Application Nos. 2019-003630, 2019-020657, and 2019-191320, the disclosure of which are incorporated herein by reference in their entirety.

FIELD

The present invention relates to a curable composition that cures by curing treatment such as irradiation with light.

BACKGROUND

Conventionally, for example, known is a curable composition that includes a (meth)acrylate monomer having, in the molecule, a (meth)acryloyl group polymerized by being irradiated with ultraviolet rays, and a low molecular isocyanate compound having, in the molecule, two or more isocyanate groups. The curable composition of this type is, for example, applied to an electronic circuit followed by being cured by irradiation with light such as ultraviolet rays to be used in an application of coating the electronic circuit (for example, Patent Literature 1).

In the curable composition disclosed in Patent Literature 1, the (meth)acrylate monomers described above react with each other by the irradiation with light such as ultraviolet rays to be polymerized, thereby forming a cured film. Further, in the curable composition disclosed in Patent Literature 1, the isocyanate groups of the low molecular isocyanate compound react with each other by moisture in air to allow polymerization to proceed. This enables a curing reaction to further proceed in a portion of the cured film that has not been irradiated with light.

CITATION LIST

Patent Literature

Patent Literature 1: JP 2014-201593 A

SUMMARY

Technical Problem

However, in the curable composition disclosed in Patent Literature 1, in which the above curing reaction by moisture proceeds only within the low molecular isocyanate compound, the curing reaction does not proceed between the low molecular isocyanate compound and the above (meth)acrylate monomer. Since no such curing reaction proceeds, there is a possibility that the curing reaction by moisture does not proceed in a portion of the cured film that has not been irradiated with light, resulting in an insufficient curing of the cured film. There is also a possibility that the cured film after being cured has its electrical insulation reduced by moisture, that is, has insufficient moisture resistance.

In view of the above problems and the like, it is an object of the present invention to provide a curable composition capable of not only being cured by light but also being sufficiently cured by moisture, and having sufficient moisture resistance after being cured.

Solution to Problem

In order to solve the above problem, a curable composition according to the present invention includes: a curable compound having, in a molecule, a branched polyolefin structure, a (meth)acryloyl group, and an isocyanate group; and an alicyclic (meth)acrylate monomer having, in a molecule, a cycloalkyl structure and a (meth)acryloyl group.

In the curable composition according to the present invention, it is preferable that the curable compound have neither a benzene ring structure nor a cycloalkyl structure in a molecule.

In the curable composition according to the present invention, it is preferable that the branched polyolefin structure of the curable compound be a branched polybutene structure. In the curable composition according to the present invention, it is preferable that the alicyclic (meth)acrylate monomer have a norbornane structure.

DESCRIPTION OF EMBODIMENTS

Figure 1:
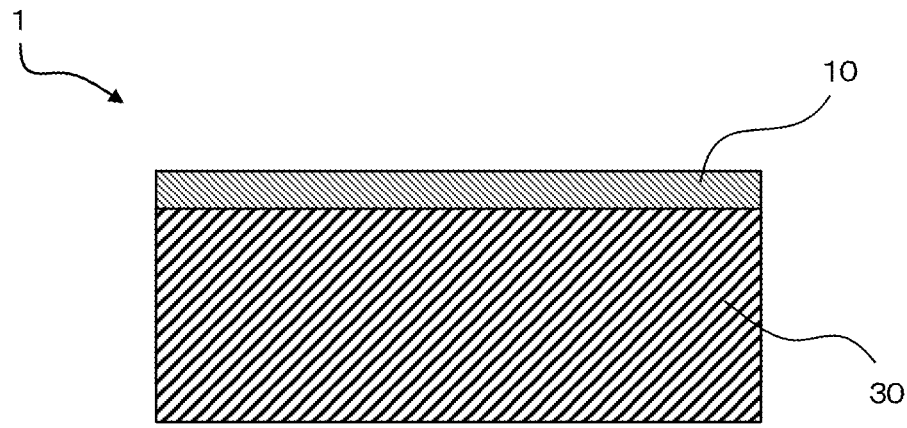
FIG. 1 is a schematic cross-sectional view of an object to be used, which is provided with a coated film.

Hereinafter, an embodiment of a curable composition according to the present invention will be described.

A curable composition of this embodiment includes: a curable compound having, in the molecule, a branched polyolefin structure, a (meth)acryloyl group, and an isocyanate group; and an alicyclic (meth)acrylate monomer having, in the molecule, a cycloalkyl structure and a (meth)acryloyl group.

In this embodiment, the curable compound is not particularly limited as long as it is a curable compound having, in the molecule, the branched polyolefin structure, at least one (meth)acryloyl group, and at least one isocyanate group. It is preferable that the curable compound have neither a benzene ring structure (i.e., an aromatic hydrocarbon composed of six cyclic carbon atoms) nor a saturated cycloalkyl structure (i.e., a saturated cyclic hydrocarbon structure) in the molecule. The curable compound has neither a polyester structure (i.e., a molecular structure with repeated ester bonds) nor a polyether structure (i.e., a molecular structure with repeated ether bonds) in the molecule.

Examples of the curable compound include a compound represented by a general formula (1) below:

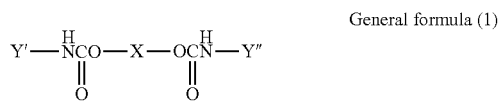

General formula (1)

[In the general formula (1), X represents a branched polyolefin structure, and Y' and Y" each represent any of general formulae (A) to (D) below. In each of the general formulae (A) to (D), $Z^1$ and $Z^2$ each independently represent a molecular structure represented by a general formula (a) below or represent —NCO, and at least one of two $Z^1$ and two $Z^2$ in Y' and Y" is the molecular structure represented by the general formula (a) below, and at least one of them is —NCO.]

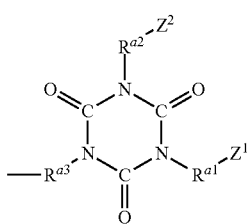

General formula (A)

[In the general formula (A), $R^{a1}$, $R^{a2}$, and $R^{a3}$ each independently represent an organic group, and $Z^1$ and $Z^2$ are as described above.]

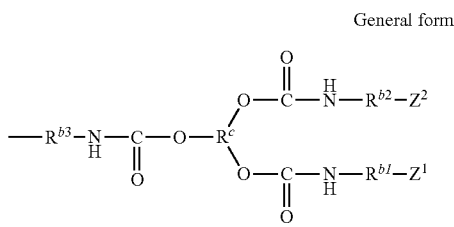

General formula (B)

[In the general formula (B), $R^{b1}$, $R^{b2}$, $R^{b3}$, and $R^c$ each independently represent an organic group, and $Z^1$ and $Z^2$ are as described above.]

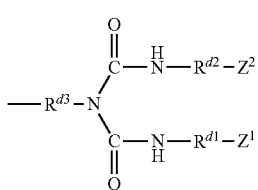

General formula (C)

[In the general formula (C), $R^{d1}$, $R^{d2}$, and $R^{d3}$ each independently represent an organic group, and $Z^1$ and $Z^2$ are as described above.]

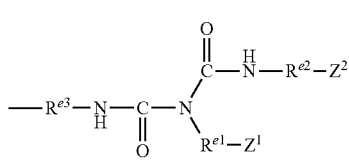

General formula (D)

[In the general formula (D), $R^{e1}$, $R^{e2}$, and $R^{e3}$ each independently represent an organic group, and $Z^1$ and $Z^2$ are as described above.]

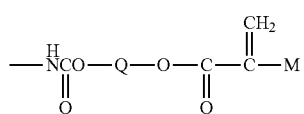

General formula (α)

[In the general formula (α), Q represents a saturated hydrocarbon group having 2 to 4 carbon atoms, and M represents H or $CH_3$.]

In the curable composition of this embodiment, the above curable compound having a meth(acrylate) group in the molecule causes a polymerization reaction by being irradiated with light such as ultraviolet rays. The polymerization of the compound causes a polymerization (curing reaction) to proceed for curing. Further, since the curable compound has —NCO (an isocyanate group) in the molecule, it causes a reaction between —NCOs of the compound also by moisture in air, and causes a bonding. This bonding also causes a polymerization (curing reaction) to proceed, thereby enabling sufficient curing. Thus, the curable composition of this embodiment is not only cured by light but can also be sufficiently cured by moisture. Further, the curable composition of this embodiment includes an alicyclic (meth)acrylate monomer having the cycloalkyl structure in the molecule, and thus has sufficient moisture resistance after being cured.

In the general formula (1), X is a branched polyolefin structure. The polyolefin of such a moiety is preferably a saturated polyolefin. That is, the polyolefin in X is preferably a branched saturated polyolefin. Examples of the branched saturated polyolefin include branched polybutene (such as hydrogenated polybutadiene).

The polyolefin structure in the general formula (1) preferably has a molecular weight of 1000 or more and 6000 or less. Such a molecular weight being 1000 or more can further suppress the mechanical characteristics of the cured product from deteriorating. Such a molecular weight being 6000 or less can further suppress the cured product from being phase-separated and becoming uneven. The molecular weight in the polyolefin structure can be obtained in terms of a standard polystyrene conversion by GPC (gel permeation chromatography) measurement before the curable compound of the general formula (1) is synthesized.

In the general formula (1), Y' and Y'' each include an isocyanurate structure, an adduct structure, or a biuret structure, of an aliphatic diisocyanate having 6 to 10 total carbon atoms. For example, a moiety of the structure represented by the general formula (A) from which $Z^1$ and $Z^2$ are removed constitutes the isocyanurate structure, a moiety of the structure represented by the general formula (B) from which $Z^1$ and $Z^2$ are removed constitutes the adduct structure, and a moiety of the structure represented by the general formula (C) or (D) from which $Z^1$ and $Z^2$ are removed constitutes the biuret structure.

The aliphatic diisocyanate having 6 to 10 total carbon atoms before forming the isocyanurate structure, the adduct structure, or the biuret structure is a compound having an isocyanate group at each of both ends of a linear alkylene group having 4 to 8 carbon atoms. Y' and Y'' are each structured with, for example, the isocyanate structure, the adduct structure, or the biuret structure, of the aliphatic diisocyanate, and thus each include neither a benzene ring structure nor a saturated cycloalkyl structure (i.e., a saturated structure having a ring composed only of carbon atoms). Y' and Y'' are each structured with the isocyanurate structure, the adduct structure, or the biuret structure, of the aliphatic diisocyanate, and thus each have neither the benzene ring structure nor the cycloalkyl structure, and the curable compound necessary has neither the benzene ring structure nor the cycloalkyl structure in the molecule. Y' and Y'' having neither the benzene ring structure nor the cycloalkyl structure allow the cured product after being cured to have better moisture resistance or better weather resistance.

Examples of the aliphatic diisocyanate having 6 to 10 total carbon atoms include hexamethylene diisocyanate (HMDI).

The isocyanurate product is a trimer of the aliphatic diisocyanate. For example, the structure of such a trimer from which a terminal —NCO is removed corresponds to the structure of the general formula (A) from which $Z^1$ and $Z^2$ are removed.

The adduct product is a reactant between the aliphatic diisocyanate and a triol having 3 to 6 carbon atoms. For example, the structure of such a reactant from which a terminal —NCO is removed corresponds to the structure of the general formula (B) from which $Z^1$ and $Z^2$ are removed. The triol having 3 to 6 carbon atoms includes, as elements, only carbon (C), oxygen (O), and hydrogen (H). Examples of the triol having 3 to 6 carbon atoms include trimethylolpropane ($CH_3$—$CH_2$—$C(CH_2$—$OH)_3$) and glycerin.

The biuret product is a reactant between the aliphatic diisocyanate and water or a tertiary alcohol. For example, the structure of a moiety of such a reactant inside a terminal —NCO corresponds to the structure of the general formula (C) or the general formula (D) from which $Z^1$ and $Z^2$ are removed.

In the general formula (1), Y' and Y" may have the same molecular structure as each other, and may have different molecular structures from each other. In the general formulae (A) to (D), $R^{a1}$ to $R^{a3}$, $R^{b1}$ to $R^{b3}$, $R^c$, $R^{d1}$ to $R^{d3}$, and $R^{e1}$ to $R^{e3}$ each are an organic group at least having carbon atoms. $R^{a1}$ to $R^{a3}$, $R^{b1}$ to $R^{b3}$, $R^c$, $R^{d1}$ to $R^{d3}$, and $R^{e1}$ to $R^{e3}$ each may include a urea bond, a biuret bond, or an allophanate bond. $R^{a1}$ to $R^{a3}$, $R^{b1}$ to $R^{b3}$, $R^{d1}$ to $R^{d3}$, and $R^{e1}$ to $R^{e3}$ each are preferably a saturated hydrocarbon having 4 to 8 carbon atoms, more preferably a linear saturated hydrocarbon having 6 carbon atoms, but each may have heteroatoms (e.g., N, O, S, or P), and each may be a branched structure. Re is preferably a saturated hydrocarbon having 4 to 8 carbon atoms, and is preferably a branched saturated hydrocarbon having 6 carbon atoms, but may include heteroatoms (e.g., N, O, S, or P), and may have a linear structure.

In the general formulae (A) to (D), $Z^1$ and $Z^2$ each independently represent a molecular structure represented by the general formula (a) above, or —NCO. Of the total number (four) of two $Z^1$ and two $Z^2$, at least one (part) is the molecular structure represented by the general formula (a) above, and at least one (all the remaining part) is —NCO. In other words, the curable compound represented by the general formula (1) has, in its molecule, at least one molecular structure represented by the general formula (a) and at least one —NCO.

In the general formula (1), $Z^1$ and $Z^2$ may be the same as each other, or may be different from each other. Further, since in the general formula (1), Y' and Y" each include $Z^1$ and $Z^2$, the general formula (1) includes two $Z^1$ and two $Z^2$. The two $Z^1$ may be the same as each other, or may be different from each other. The same applies to the two $Z^2$. In other words, the two $Z^1$ and the two $Z^2$ each are individually defined independently from each other.

In the general formula (α), a saturated hydrocarbon group having 2 to 4 carbon atoms represented by Q is preferably linear. In other words, Q is preferably a linear saturated hydrocarbon group having 2 to 4 carbon atoms. The number of carbon atoms of the saturated hydrocarbon group in Q is preferably 2.

Examples of the curable compound represented by the general formula (1) include compounds represented by general formulae (1a) to (1f) below:

General formula (1a)

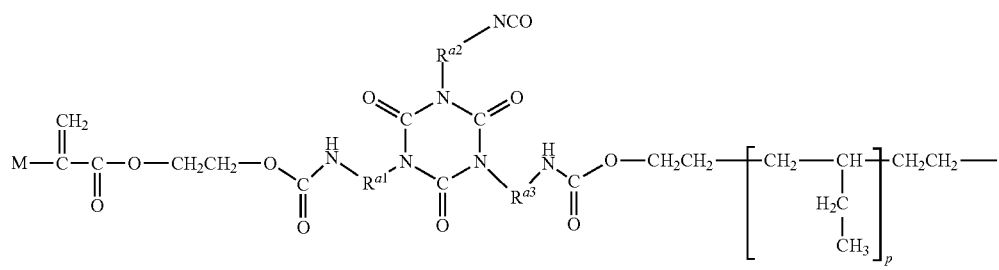

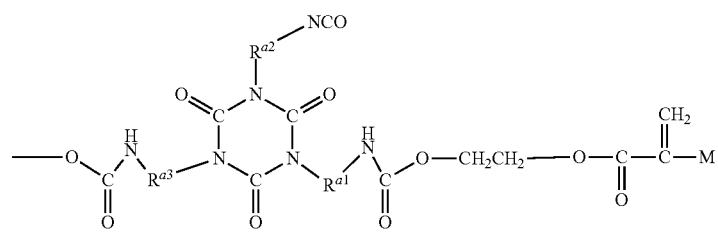

[where $R^{a1}$, $R^{a2}$, and $R^{a3}$ each independently represent an organic group and are preferably a linear saturated hydrocarbon having 4 to 8 carbon atoms, p is from 20 to 300, and M is H or $CH_3$.]

General formula (1b)

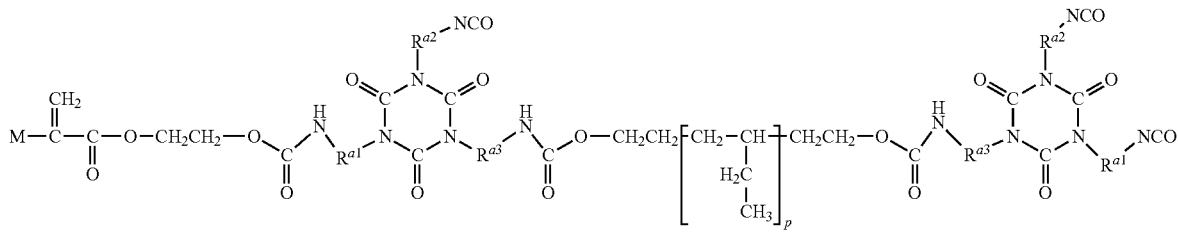

[where $R^{a1}$, $R^{a2}$, and $R^{a3}$ each independently represent an organic group and are preferably a linear saturated hydrocarbon having 4 to 8 carbon atoms, p is from 20 to 300, and M is H or $CH_3$.]

General formula (1c)

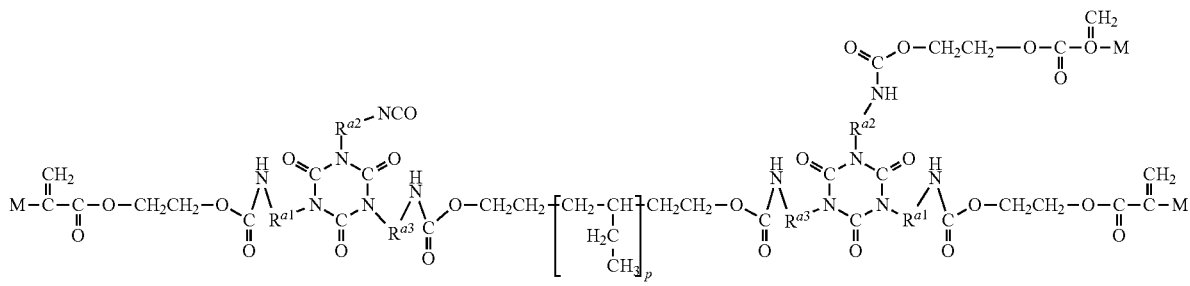

[where $R^{a1}$, $R^{a2}$, and $R^{a3}$ each independently represent an organic group and are preferably a linear saturated hydrocarbon having 4 to 8 carbon atoms, p is from 20 to 300, and M is H or $CH_3$.]

General formula (1d)

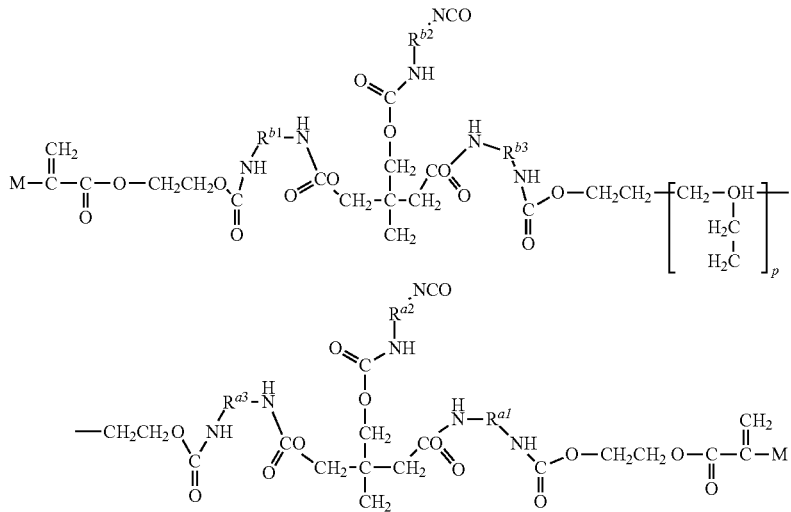

[where $R^{b1}$, $R^{b2}$, and $R^{b3}$ each independently represent an organic group and are preferably a linear saturated hydrocarbon having 4 to 8 carbon atoms, p is from 20 to 300, and M is H or $CH_3$.]

General formula (1e)

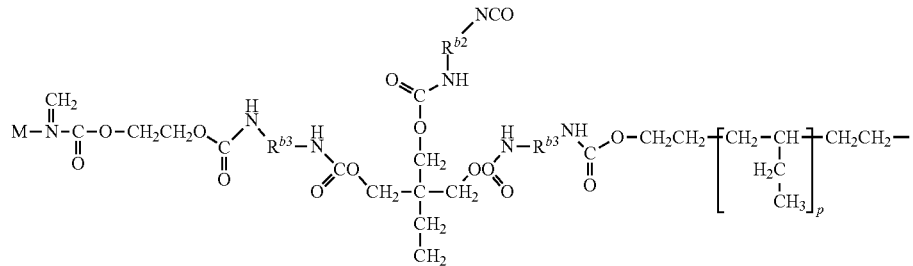

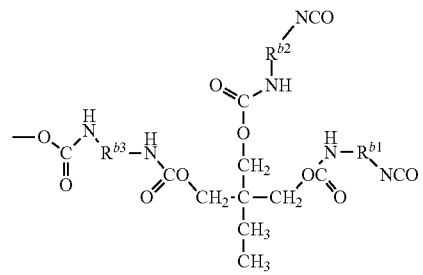

[where $R^{b1}$, $R^{b2}$, and $R^{b3}$ each independently represent an organic group and are preferably a linear saturated hydrocarbon having 4 to 8 carbon atoms, p is from 20 to 300, and M is H or $CH_3$.]

General formula (1f)

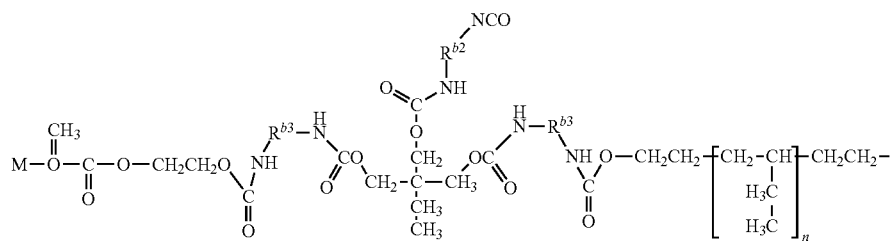

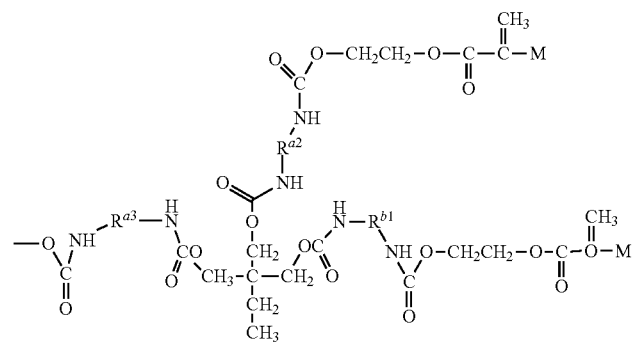

[where $R^{b1}$, $R^{b2}$, and $R^{b3}$ each independently represent an organic group and are preferably a linear saturated hydrocarbon having 4 to 8 carbon atoms, p is from 20 to 300, and M is H or $CH_3$.]

As the molecular structure represented by the general formula (α), the structure represented by a formula (α-1) below is preferable. The molecular structure represented by the formula (α-1) below has an ethylene group with little steric hindrance, and thus has an advantage of increasing the polymerization rate by irradiation with ultraviolet rays or the like. When the number of carbon atoms of Q in the general formula (α) is 1 (that is, a methylene group), the molecular structure thereof tends to be easily decomposed at the time of curing.

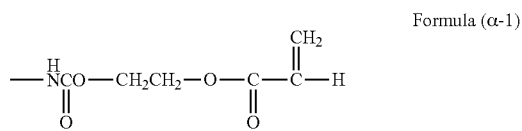

Formula (α-1)

The curable composition of this embodiment includes, for example, a urethanization reaction product of a branched polyolefin diol (hereinafter referred to simply as <component A>); at least one selected from the isocyanurate product, the adduct product, and the biuret product, of the aliphatic diisocyanate having 6 to 10 total carbon atoms (hereinafter referred to simply as <component B>); and a hydroxy saturated $C_1$ to $C_4$ alkyl (meth)acrylate (hereinafter referred to simply as <component C>). In other words, the curable composition of this embodiment includes, for example, the alicyclic (meth)acrylate monomer, and a curable compound obtained by a urethanization reaction of at least the <component A>, the <component B>, and the <component C>.

The curable compound is a part of the urethanization reaction product of at least the <component A>, the <component B>, and the <component C>. In other words, the curable compound can be obtained by a urethanization reaction of at least the <component A>, the <component B>, and the <component C>.

For example, the curable composition of this embodiment includes, as the above urethanization reaction product, at least the curable compound represented by the general formula (1) above. The curable composition of this embodiment includes, in addition to the curable compound represented by the general formula (1) above, a byproduct generated by the urethanization reaction. The curable composition of this embodiment further includes a trace amount of a urethanization reaction catalyst mixed for the urethanization reaction. Note that the urethanization reaction product will be described in detail later.

The curable composition of this embodiment, which includes at least the curable compound represented by the general formula (1) above, is not only cured by light, but can also be sufficiently cured by moisture, as aforementioned. The curable composition of this embodiment also includes the byproduct generated by the urethanization reaction, and the byproduct, which can also cause a curing reaction by irradiation with light or moisture, is not only cured by light but can also be sufficiently cured by moisture.

<Component A>

The component A is a branched polyolefin diol. A polyolefin diol has a molecule having each of both ends provided with a hydroxy group. The olefin moiety has no polar group such as an ether group or an ester group, and is composed only of a saturated hydrocarbon.

Examples of the component A include polypropylenediol, polybutenediol (hydrogenated 1,2-polybutadienediol), and hydrogenated polyisoprenediol. As the component A, polybutenediol (hydrogenated 1,2-polybutadienediol) is preferable in terms of being capable of imparting sufficient mechanical flexibility to the cured product (film) after being cured.

The component A has a molecular weight of preferably 1000 or more and 6000 or less.

<Component B>

The component B is polyisocyanate, and is at least one selected from the isocyanurate product, the adduct product, and the biuret product, of the aliphatic diisocyanate having 6 to 10 total carbon atoms. The component B has three or four isocyanate groups in the molecule. It is preferable that the component B have, in the molecule, neither the benzene ring structure (aromatic ring structure) nor the saturated cycloalkyl structure (saturated structure with a ring composed only of carbon atoms).

The isocyanurate product as the component B is, for example, the trimer of hexamethylene diisocyanate (HMDI) described above, and has three isocyanate groups in the molecule.

The adduct product as the component B is, for example, a reactant of trimethylolpropane and an aliphatic diisocyanate having 6 to 10 total carbon atoms (such as HMDI described above). Such an adduct product has three isocyanate groups in the molecule.

As the component B, an adduct product in which hexamethylene diisocyanate (HMDI) and trimethylolpropane react with each other, or an isocyanurate product (trimer) of hexamethylene diisocyanate (HMDI) is preferable because it has no benzene ring and thus has good weather resistance after being cured, and because it has good solubility in a diluent when the diluent coexists in the urethanization reaction.

<Component C>

The component C is a $C_1$ to $C_4$ saturated alkyl ester of a (meth)acrylate, which has one hydroxy group bonded to any carbon of the alkyl moiety. The component C is preferably a hydroxy saturated $C_2$ to $C_3$ alkyl (meth)acrylate.

Examples of the component C include 2-hydroxyethyl (meth)acrylate, 2-hydroxypropyl(meth)acrylate, 3-hydroxypropyl(meth)acrylate, 2-hydroxybutyl(meth)acrylate, and 4-hydroxybutyl(meth)acrylate. In terms of having better polymerizability by irradiation with light, the component C is preferably 2-hydroxyethyl(meth)acrylate, more preferably 2-hydroxyethylacrylate.

The molar ratio of the component B to the component A in the urethanization reaction is preferably 2.0 or more and 2.5 or less, more preferably 2.0 or more and 2.2 or less.

The molar ratio of the component C to the component B in the urethanization reaction is preferably 0.5 or more and 2.0 or less, more preferably 0.5 or more and 1.5 or less.

The molar ratio of the component C to the component A in the urethanization reaction is preferably 1.0 or more and 4.0 or less, more preferably 1.0 or more and 3.0 or less.

<Urethanization Reaction Catalyst>

As the urethanization reaction catalyst, a metal-based catalyst, which is an organotin catalyst such as dibutyltin dilaurate or stannous octoate, an acetylacetonate complex catalyst, or the like, can be used. Further, as the urethanization reaction catalyst, a tertiary amine catalyst can be used.

The curable composition (curing composition) of this embodiment includes the urethanization reaction product generated by a urethanization reaction in the presence of the component A, the component B, and the component C.

Examples of the urethanization reaction product include a compound represented by the general formula (1) above, such as the compounds represented by the general formulae (1a) to (1f) above.

Further, examples of the urethanization reaction product include a compound having only an isocyanate group as a reactive group, and a compound having only a hydroxy group as a reactive group. In another aspect, examples of the urethanazation reaction product include a compound that is a urethanization reaction product between the component A and the component B and has no component C introduced into the molecule, and a compound that is a urethanization reaction product between the component B and the component C and has no component A introduced into the molecule.

The curable composition of this embodiment may further include a photopolymerizable monomer that does not undergo a urethanization reaction. Such a photopolymerizable monomer may be mixed as a diluent before the urethanization reaction to reduce the viscosity in the urethanization reaction system, and may be blended after the urethanization reaction. Specifically, the curable composition of this embodiment includes the alicyclic (meth)acrylate monomer having the cycloalkyl structure and a (meth)acryloyl group in the molecule, as the photopolymerizable monomer that does not undergo a urethanization reaction. The alicyclic (meth)acrylate monomer is a compound that produces a polymerization reaction product by being irradiated with light.

The alicyclic (meth)acrylate monomer is preferably a saturated alicyclic monomer having 8 to 15 carbon atoms in the molecule. It is preferable that the alicyclic (meth)acrylate monomer have none of benzene rings, ether bonds ($-CH_2-O-CH_2-$), and polar groups such as an $-OH$ group and a $-COOH$ group in the molecule. The alicyclic (meth)acrylate monomer is preferably a monofunctional monomer having one (meth)acrylate group in the molecule. In the alicyclic (meth)acrylate monomer, the cycloalkyl structure may be a saturated hydrocarbon structure having no heteroatoms and constituted by 4 to 8 carbon atoms. The alicyclic (meth)acrylate monomer may be monocyclic, bicyclic, or polycyclic. A bicyclic or polycyclic saturated cycloalkyl structure may share two or more carbon atoms. The alicyclic (meth)acrylate monomer may have a norbornane structure. Specifically, examples of the alicyclic (meth)acrylate monomer include isobornyl (meth)acrylate, dicyclopentenyl (meth)acrylate, adamantyl (meth)acrylate, tricyclodecane (meth)acrylate, dicyclopentadiene oxyethyl (meth)acrylate, dicyclopentanyl (meth)acrylate, tetrahydrofurfuryl (meth)acrylate, morpholine (meth)acrylate, and dicyclopentanyl di(meth)acrylate. The curable composition including the alicyclic (meth)acrylate monomer enables the cured product after being cured to increase its moisture resistance.

The curable composition of this embodiment can include an unreacted component A, an unreacted component B, and an unreacted component C, which have not undergone a urethanization reaction. The curable composition of this embodiment can include the urethanization reaction catalyst mixed for accelerating a urethanization reaction. As described above, the curable composition of this embodiment includes various reaction products and unreacted products. Therefore, it would not be practical to specify the molecular structures of all the compounds included in the curable composition. In other words, it would be rather impractical to directly specify the structures or characteristics of all the compounds included in the curable composition of this embodiment. However, since the molecular structures of the compounds before the urethanization reaction are specified and the product resulting from the urethanization reaction can be reliably expected, the molecular structures of the reaction products (main product, byproduct) are obvious.

The curable composition of this embodiment may include a photopolymerizable monomer, an isocyanate monomer, a photopolymerization initiator, and the like, which are further added after the urethanization reaction. Examples of the photopolymerizable monomer include the aforementioned acyclic (meth)acrylate monomers, and a photopolymerizable monomer that does not undergo a urethanization reaction other than the acyclic (meth)acrylate monomers.

Examples of the photopolymerizable monomer that does not undergo a urethanization reaction include a monofunctional (meth)acrylate monomer and a polyfunctional (meth)acrylate monomer, as described below. Examples of the monofunctional (meth)acrylate monomer include phenyloxyethyl (meth)acrylate, phenoxypolyethylene glycol (meth)acrylate, benzyl (meth)acrylate, lauryl (meth)acrylate, isodecyl (meth)acrylate, stearyl (meth)acrylate, isooctyl (meth)acrylate, tridecyl (meth)acrylate, and ethoxydiethylene glycol (meth)acrylate. Examples of the polyfunctional (meth)acrylate monomer include neopentyl glycol di(meth)acrylate, polyethylene glycol di(meth)acrylate, 1,6-hexanediol di(meth)acrylate, polypropylene glycol di(meth)acrylate, ethylene oxide modified bisphenol A di(meth)acrylate, ethylene oxide modified trimethylol propane tri(meth)acrylate, ethylene oxide modified pentaerythritol tetra(meth)acrylate, tris[(meth)acryloxyethyl] isocyanurate, ethylene oxide modified dip entaerythritol hexa(meth)acrylate, and epoxy (meth)acrylate. One of these monomers can be individually used, or two or more of them can be used in combination. As the photopolymerizable monomer, a monomer having none of benzene rings, ether bonds ($-CH_2-O-CH_2-$), and polar groups such as an $-OH$ group and a $-COOH$ group is preferable in terms of allowing the cured product after being cured to have better weather resistance.

Examples of the isocyanate monomer that is added after the urethanization reaction include an aromatic diisocyanate monomer, an alicyclic diisocyanate monomer, and an aliphatic diisocyanate monomer. These monomers may have 2 to 4 isocyanate groups in the molecule. Examples of the aromatic diisocyanate monomer include monomers respectively of tolylene diisocyanate, diphenylmethane diisocyanate, diphenylpropane diisocyanate, triphenylmethane diisocyanate, phenylene diisocyanate, xylylene diisocyanate, naphthalene diisocyanate, and tolidine diisocyanate. Examples of the alicyclic diisocyanate monomer include monomers respectively of hydrogenated tolylene diisocyanate, hydrogenated diphenylmethane diisocyanate, hydrogenated xylylene diisocyanate, cyclohexylylene diisocyanate, 3-isocyanatemethyl-3,5,5-trimethylcyclohexylisocyanate (isophorone diisocyanate), 3-isocyanateethyl-3,5,5-trimethylcyclohexylisocyanate, and 3-isocyanateethyl-3,5,5-triethylcyclohexylisocyanate. Examples of the aliphatic diisocyanate monomer include a hexamethylene diisocyanate monomer. The isocyanate monomer may be an adduct product, a biuret product, an isocyanurate product, or a polymeric product of at least one of the above monomers. One of these monomers can be individually used, or two or more of them can be used in combination. As the isocyanate monomer, a monomer including neither a benzene ring nor an unsaturated bond is preferable in terms of allowing the cured product after being cured to have better weather resistance.

It is preferable that the curable composition of this embodiment include no compound having benzene rings (i.e., aromatic hydrocarbon composed of six cyclic carbon atoms) in the molecule as the urethanization reaction product (curable compound), the photopolymerizable monomer, or the isocyanate monomer.

The photopolymerization initiator is not particularly limited as long as it is a compound that generates radicals by irradiated light (e.g., ultraviolet rays). Examples of the photopolymerization initiator include an acetophenone-based photoinitiator, a benzoin-based photoinitiator, a benzophenone-based photoinitiator, a thioxanthone-based photoinitiator, and an acylphosphine oxide-based photoinitiator. As the photopolymerization initiator, a commercially available product can be used.

The curable composition of this embodiment can include a photosensitizer, a polymerization inhibitor, an antioxidant, a dye, a pigment, a phosphor, or the like as appropriate.

The curable composition of this embodiment preferably includes 10 mass % or more of the compound represented by the general formula (1). This allows the curable composition to be more sufficiently cured by both light and moisture. The curable composition of this embodiment may include 90 mass % or less of the curable compound represented by the general formula (1). The curable composition of this embodiment may include 10 mass % or more of a photopolymerizable monomer that includes the alicyclic (meth)acrylate monomer (i.e., that does not undergo a urethanization reaction), and may include 85 mass % or less of the same. The curable composition of this embodiment may include 2 mass % or more of an isocyanate monomer other than the curable compound above, and may include 20 mass % or less of the same.

Next, an embodiment of a method for producing the curable composition according to the present invention will be described.

In the method for producing the curable composition according to this embodiment, for example, a curable composition including the urethanization reaction product is produced by the urethanization reaction under the presence of; the branched polyolefin diol (the component A); at least one selected from the isocyanurate product, the adduct product, and the biuret product, of the aliphatic diisocyanate having 6 to 10 total carbon atoms (the component B); and the hydroxy saturated $C_1$ to $C_4$ alkyl (meth)acrylate (the component C).

Specifically, the method for producing the curable composition of this embodiment includes a reacting step of synthesizing the urethanization reaction product including the curable compound by the urethanization reaction under the presence of the component A, the component B, the component C, and the urethanization reaction catalyst. The method for producing the curable composition of this embodiment further includes an adding step of further adding the photopolymerizable monomer, the isocyanate monomer, and the photopolymerization initiator, after the reacting step.

The component A, the component B, the component C, and the urethanization reaction catalyst used in the reacting step are as described above.

In the producing method, the reacting step is generally performed after air in a reaction vessel is replaced with dry nitrogen gas, in order to prevent reaction with moisture.

In the reacting step, general reaction conditions suitable for the urethanization reaction can be employed. Preferably, in the reacting step, the urethanization reaction is carried out by maintaining a temperature of 50 to 70° C. for 0.5 to 3 hours.

In the reacting step, the preferable ratios (molar ratios) of the mixing amounts of the component A, the component B, and the component C are as described above.

In the reacting step, a compound that is not involved in the urethanization reaction and produces a polymerization reaction product by being irradiated with light may further coexist. Examples of such a compound include the photopolymerizable monomers such as the alicyclic (meth)acrylate monomer as aforementioned.

In the adding step, the photopolymerizable monomer, the isocyanate monomer, and the photopolymerization initiator as described above may be further added after the urethanization reaction. The photopolymerizable monomer and the isocyanate monomer to be further added have low viscosity, and thus each serve as a solvent for diluting the curable compound, and also serve to more sufficiently cure the cured product as they themselves are cured by light or moisture. Further including the photopolymerizable monomer and the isocyanate monomer results in a low viscosity of the curable composition for curing, thereby simplifying the step at the time of the application of the curable composition for use.

In the adding step, a photosensitizer, a polymerization inhibitor, an antioxidant, a dye, a pigment, a phosphor, and the like may be further included as appropriate.

Figure 2:
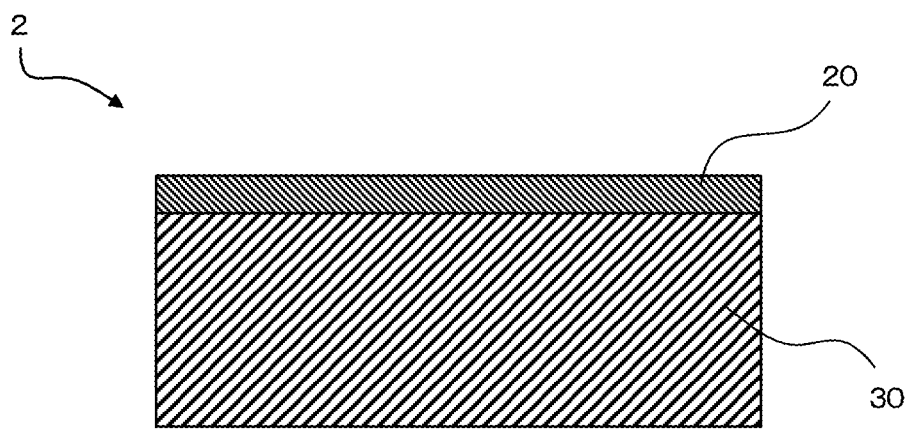
FIG. 2 is a schematic cross-sectional view of an object to be used, which is provided with a cured film.

The curable composition of this embodiment is used as a cured product cured by being irradiated with light such as ultraviolet rays (see FIG. 1 and FIG. 2 shown as examples). For example, an electronic circuit (object 30) to be coated is coated with the curable composition to form a coated film 10 and produce an object to be used 1 provided with the coated film. Thereafter, the coated film of the composition is cured by being irradiated with light such as ultraviolet rays to form a cured film 20 made of the cured product. Further, the film is left to stand in air for several hours to several days to allow a curing reaction to proceed by moisture in the air and produce an object to be used 2 provided with the cured film.

As the light to be irradiated to allow a curing reaction to proceed, ultraviolet rays can be used. Examples of a light source that can be used include a high-pressure mercury lamp, a metal halide lamp, a xenon lamp, a chemical lamp, and an LED lamp. As an irradiation intensity, for example, 10 to 10,000 mW/cm² can be employed.

In order to allow a curing reaction by moisture to further proceed, it is preferable that the temperature of air in which the cured product is left to stand be 20 to 40° C., and the humidity of the air be 40 to 90% RH.

Examples of the object 30 to be coated by applying the curable composition thereto include an electronic circuit or a terminal on a mounting board used for precision devices, an electronic circuit or a terminal on a mounting board mounted on vehicles (e.g., automobiles, bicycles, railway trains, aircraft, ships), an electronic circuit or a terminal on a mounting board used for mobile devices (e.g., cell phones, digital cameras, digital video cameras), an electronic circuit or a terminal on a board used for outdoor equipment (e.g., water heaters, air conditioner outdoor units), and an electronic circuit or a terminal on a mounting board used for water-use equipment (e.g., laundry machines, electronic bidets, dishwasher dryers).

The curable composition and the method for producing the composition, of this embodiment are as exemplified above, but the present invention is not limited to the above exemplified curable composition and method for producing the composition. That is, various forms used in general curable compositions and methods for producing the compositions can be employed without imparting the effect of the present invention.

EXAMPLES

Next, the present invention will be described in more detail by way of experimental examples, but the present invention is not limited thereto.

As described below, a urethanization reaction was undergone by mixing (A) to (C) to produce a curable composition including the curable compound represented by the general formula (1).

<Raw Materials in Reacting Step>
(A) Branched Polyolefindiol
 (A-1) Hydrogenated polybutadienediol (average molecular weight of 1,500)
  Product name "NISSO-PB GI-1000"
   Hydroxyl value (KOHmg/g=67 mg) manufactured by Nippon Soda Co., Ltd.
 (A-2) Hydrogenated polybutadienediol (average molecular weight of 2,000)
  Product name "NISSO-PB GI-2000"
   Hydroxyl value (KOHmg/g=50 mg) manufactured by Nippon Soda Co., Ltd.
 (A-3) Hydrogenated polybutadienediol (average molecular weight of 3,100)
  Product name "NISSO-PB GI-3000"
   Hydroxyl value (KOHmg/g=30 mg) manufactured by Nippon Soda Co., Ltd.
(B) Derivative of an Aliphatic Diisocyanate Having 6 to 10 Total Carbon Atoms
 Isocyanurate derivative of hexamethylene diisocyanate (HMDI)
  Product name "DURANATE TSR-100: Isocyanate group content of 20.4%" manufactured by ASAHI KASEI CORPORATION
(C) Hydroxy Saturated $C_1$ to $C_4$ Alkyl (Meth)Acrylate
 2-hydroxyethyl acrylate (commercially available product)
(Others)
 Photopolymerizable monomer (reaction solvent/diluent) (isobornyl acrylate, commercially available product)
 Urethanization reaction catalyst (dibutyltin dilaurate, commercially available product)

<Raw Materials in Adding Step>
 Photopolymerizable monomer (isobornyl acrylate, commercially available product)
 Multifunctional isocyanate
  Isocyanurate derivative of hexamethylene diisocyanate (HMDI)
   Product name "DURANATE TSR-100" manufactured by ASAHI KASEI CORPORATION
 Fluorescent dye: Product name "Tinopal OB" manufactured by BASF Japan Ltd.
 Photopolymerization initiator: Product name "IRGACURE 907" manufactured by IGM Resins B.V.
 Photosensitizer (2,4-diethylthioxanthone)
  Product name "KAYACURE DETX-S" Nippon Kayaku Co., Ltd.

Example 1

A urethanization reaction was undergone at 60° C. for one hour under the presence of the above (A), (B), (C), the reaction solvent, and the reaction catalyst in the mixing amounts shown in Table 1 to perform the reacting step. Next, the above raw materials in the mixing amounts shown in Table 1 were added to the composition after the reacting step and mixed to perform the adding step. Thus, a curable composition was produced.

Examples 2 to 4

Curable compositions were produced in the same manner as in Example 1, except that the mixing compositions were changed to the corresponding ones shown in Table 1 in the adding step.

FT-IR analysis of the reaction products generated in the reacting step of Example 1 and Example 2 could confirm that the compound represented by the general formula (1) was synthesized.

Comparative Example

A curing composition was obtained in the same manner as in Example 1, except that nonylacrylate was used as the photopolymerizable polymer in substitution for isobornyl acrylate.

Table 1 shows the mixing compositions for producing the curable compositions of Examples 1 and 2 and Comparative Example.

TABLE 1

|  |  | Ex. 1 (mass parts) | Ex. 2 (mass parts) | Ex. 3 (mass parts) | Ex. 4 (mass parts) | C. Ex. (mass parts) |
|---|---|---|---|---|---|---|
| Reacting step | Component (A) (A-1) | 100 | 100 | — | — | 100 |
|  | Component (A) (A-2) | — | — | 100 | — | — |
|  | Component (A) (A-3) | — | — | — | 100 | — |
|  | Component (B) | 73.8 | 73.8 | 55.2 | 32.3 | 73.8 |
|  | Component (C) | 13.9 | 13.9 | 10.4 | 6.1 | 13.9 |
|  | Photopolymerizable monomer (reaction solvent) | 125 | 125 | 166 | 138 | 125 |
|  | Urethanization reaction catalyst | 0.019 | 0.019 | 0.0041 | 0.0035 | 0.019 |
|  | Subtotal | 313 | 313 | 332 | 276 | 313 |
| Adding step | Photopolymerizable monomer | 626 | 104 | 54 | 78 | 156 |
|  | Multifunctional isocyanate | 104 | 46.4 | 42.9 | 39.5 | 52.1 |
|  | Fluorescent dye | — | — | 0.33 | 0.28 | — |
|  | Photopolymerization initiator | 31 | 14 | 13 | 12 | 16 |
|  | Photosensitizer | 5 | 2 | 2 | 2 | 3 |
|  | Total | 1079 | 479 | 444 | 408 | 540 |

Each of the curable compositions produced in Examples and Comparative Example was evaluated as described below. Specifically, the volume resistivity and the breakdown voltage (BDV) of each of the curable compositions produced were investigated. In general, the higher volume resistivity and the higher breakdown voltage (BDV), the more sufficiently curing has proceeded.

<Curing>

A tin plate having a size of 0.3×130×180 mm was coated with each of the compositions so that the thickness of the cured product after being cured was 100 μm. The samples to be cured by light were irradiated with ultraviolet rays by a 500 W UV lamp so that the integrated light amount reaches 3000 mJ/cm$^2$ light intensity. Thereafter, both the irradiated and unirradiated samples were left to stand in a constant temperature and humidity apparatus set to 40° C. and 90% RH for 72 hours, and were subjected to a curing treatment by moisture (hereinafter referred to as normal). Further, some of them were immersed in water for 24 hours (hereafter referred to as post-immersed).

<Volume Resistivity>

A paste-like silver conductive coating material was applied in a circular shape (with a diameter of 30 mm) to each of the cured products cured as above. The material was allowed to dry at 60° C. for 30 minutes to form an upper electrode. On the other hand, the tin plate arranged on an opposite side of each of the cured products served as a lower electrode. A voltage of DC 100 V was applied, and a resistance value after 60 seconds was obtained. Then, the volume resistivity was obtained by multiplying the area of the electrodes by the resistance value, and then dividing the obtained value by the thickness of the cured product (cured film).

<Breakdown Voltage (BDV)>

The sphere of a sphere-plate electrode described in JIS C2110-1 was placed on the cured product to form an upper electrode. On the other hand, the tin plate served as a lower electrode. A breakdown voltage value was measured by applying an AC voltage of 60 Hz and boosting the voltage to cause breakdown to occur in 10 to 20 seconds. The measurement was conducted in oil. Further, the obtained value was divided by the thickness of the cured product (cured film) to determine a breakdown voltage value per 0.1 mm (kV/0.1 mm).

Table 2 shows the evaluation results of the volume resistivity and the breakdown voltage (BDV) of the cured product after being cured. The polymer ratio in Table 2 is a ratio of the curable compound in the curable composition, and is a value calculated from the mixing ratio upon the confirmation that the yield of the urethanization reaction in the reacting step is 100%.

TABLE 2

|  |  |  | Ex. 1 | Ex. 2 | Ex. 3 | Ex. 4 | C. Ex. |
|---|---|---|---|---|---|---|---|
| Polymer ratio [mass %] |  |  | 17 | 39 | 37 | 34 | 35 |
| Viscosity [mPa · s] |  |  | 100 | 1,000 | 1,000 | 1,000 | 100 |
| Uniformity of cured film |  |  | ○ | ○ | ○ | ○ | × (partially separated) |
| Volume resistivity [Ω · cm] | Normal | Unirradiated | $1.0 \times 10^{13}$ | $3.9 \times 10^{13}$ | $1.9 \times 10^{13}$ | $4.2 \times 10^{13}$ | $1.3 \times 10^{13}$ |
|  |  | Irradiated | $1.2 \times 10^{15}$ | $1.1 \times 10^{15}$ | $1.7 \times 10^{15}$ | $2.4 \times 10^{15}$ | $9.5 \times 10^{12}$ |
|  | After 24-hr immersion | Unirradiated | $2.8 \times 10^{14}$ | $2.6 \times 10^{14}$ | $2.2 \times 10^{13}$ | $1.1 \times 10^{14}$ | $2.8 \times 10^{15}$ |
|  |  | Irradiated | $1.2 \times 10^{15}$ | $1.1 \times 10^{15}$ | $1.8 \times 10^{15}$ | $2.5 \times 10^{15}$ | $1.8 \times 10^{13}$ |
| Breakdown voltage (BDV) [kV/0.1 mm] | Normal | Unirradiated | 8.6 | 9.8 | 8.3 | 8.9 | 8.3 |
|  |  | Irradiated | 10.2 | 11.8 | 10.9 | 9.7 | 7.6 |
|  | After 24-hr immersion | Unirradiated | 11.3 | 11.3 | 9.6 | 9.4 | 9.1 |
|  |  | Irradiated | 8.3 | 10.9 | 12.8 | 11.4 | 9.1 |

As is understood from the evaluation results shown in Table 2, the curable compositions of Examples are not only cured by light but can also be sufficiently cured by moisture. Specifically, the volume resistivity and the breakdown voltage of each of Examples indicate that these measured values sufficiently increased by the curing treatment by moisture. Thus, it can be said that the curable compositions of Examples can not only be cured by light but can also be sufficiently cured by moisture. Further, each of Examples more suppressed a reduction in the electrical insulation of the cured product after being cured and had more sufficient moisture resistance than Comparative Example. In the sample that has been irradiated with light, the decrease in the breakdown voltage (BDV) after immersion is considered to be caused by an increase in the dielectric constant resulting from moisture absorption of the measurement sample since the volume resistivity is measured using direct electric current while the breakdown voltage (BDV) is measured using alternating electric current.

INDUSTRIAL APPLICABILITY

The curable composition of the present invention is, for example, applied to an electronic circuit, then irradiated with light for curing, and formed into a cured product to be suitably used to coat the electronic circuit with a cured product. The curable composition of the present invention is suitably used, for example, as a curable composition for an insulating coating.

REFERENCE SIGNS LIST

1: Object to be used, provided with coated film
2: Object to be used, provided with cured film
10: Coated film
20: Cured film
30: Object

The invention claimed is:

1. A curable composition comprising:
a curable compound having, in a molecule, a branched polyolefin structure, a (meth)acryloyl group, and an isocyanate group; and
an alicyclic (meth)acrylate monomer having, in a molecule, a cycloalkyl structure and a (meth)acryloyl group,
wherein the alicyclic (meth)acrylate monomer has a norbornane structure.

2. The curable composition according to claim 1, wherein the curable compound has neither a benzene ring structure nor a cycloalkyl structure in a molecule.

3. The curable composition according to claim 1, wherein the branched polyolefin structure of the curable compound is a branched polybutene structure.

4. The curable composition according to claim 2, wherein the branched polyolefin structure of the curable compound is a branched polybutene structure.

* * * * *